United States Patent
Singh

(10) Patent No.: US 8,868,620 B2
(45) Date of Patent: Oct. 21, 2014

(54) TECHNIQUES FOR COMPOSING DATA QUERIES

(75) Inventor: Hardeep Singh, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/760,649

(22) Filed: Jun. 8, 2007

(65) Prior Publication Data

US 2008/0306910 A1    Dec. 11, 2008

(51) Int. Cl.
  *G06F 17/30*    (2006.01)
(52) U.S. Cl.
  CPC ............................... *G06F 17/30926* (2013.01)
  USPC ..... 707/805; 707/713; 707/797; 707/E17.014
(58) Field of Classification Search
  USPC ............... 707/4, 999.004, 999.102, 805, 713, 707/797, E17.014
  See application file for complete search history.

(56) References Cited

U.S. PATENT DOCUMENTS

| | | | | |
|---|---|---|---|---|
| 5,421,008 A | * | 5/1995 | Banning et al. | 707/4 |
| 5,590,322 A | * | 12/1996 | Harding et al. | 1/1 |
| 5,619,688 A | * | 4/1997 | Bosworth et al. | 1/1 |
| 5,630,122 A | * | 5/1997 | Kaplan et al. | 707/769 |
| 5,701,456 A | * | 12/1997 | Jacopi et al. | 707/4 |
| 5,721,901 A | * | 2/1998 | Banning et al. | 1/1 |
| 5,911,138 A | * | 6/1999 | Li et al. | 707/3 |
| 6,016,488 A | * | 1/2000 | Bosworth et al. | 1/1 |
| 6,208,985 B1 | * | 3/2001 | Krehel | 707/767 |
| 6,233,583 B1 | * | 5/2001 | Hoth | 707/102 |
| 6,279,016 B1 | * | 8/2001 | De Vorchik et al. | 715/210 |
| 6,519,603 B1 | * | 2/2003 | Bays et al. | 1/1 |
| 6,526,415 B2 | | 2/2003 | Smith et al. | |
| 6,598,042 B1 | * | 7/2003 | Kienan | 707/3 |
| 7,089,266 B2 | * | 8/2006 | Stolte et al. | 707/769 |
| 7,149,983 B1 | * | 12/2006 | Robertson et al. | 715/810 |
| 7,457,810 B2 | * | 11/2008 | Breining et al. | 1/1 |
| 7,480,666 B2 | * | 1/2009 | Boyle et al. | 1/1 |
| 7,617,184 B2 | * | 11/2009 | Ferrari et al. | 1/1 |
| 7,624,122 B2 | * | 11/2009 | Gaurav et al. | 1/1 |
| 7,716,173 B2 | * | 5/2010 | Stolte et al. | 707/600 |
| 8,190,631 B2 | * | 5/2012 | Ah-Soon et al. | 707/769 |
| 8,332,383 B2 | * | 12/2012 | Posner et al. | 707/708 |
| 2003/0065650 A1 | * | 4/2003 | Annand et al. | 707/3 |

(Continued)

FOREIGN PATENT DOCUMENTS

WO    2005006216    1/2005

OTHER PUBLICATIONS

Stolte et al., "Query, Analysis, and Visualization of Hierarchically Structured Data Using Polaris", In Proceedings of the Eighth ACM SIGKDD International Conference on Knowledge Discovery and Data Mining, 2002, pp. 112-122.*

(Continued)

*Primary Examiner* — Phuong Thao Cao
(74) *Attorney, Agent, or Firm* — Patterson & Sheridan, LLP

(57) ABSTRACT

Embodiments of the invention provide techniques for composing data queries. In one embodiment, a mapping template is provided to represent data in terms that are easy to understand. The mapping template is used to provide a tree structure made up of nodes that are queried. A query may be composed by navigating the tree structure to select nodes of interest and specifying predicates for the selected nodes. Once the query is composed, it may be executed against the data.

21 Claims, 6 Drawing Sheets

(56) References Cited

U.S. PATENT DOCUMENTS

| | | | |
|---|---|---|---|
| 2003/0149934 A1* | 8/2003 | Worden | 715/513 |
| 2003/0200218 A1* | 10/2003 | Tijare et al. | 707/100 |
| 2003/0212664 A1* | 11/2003 | Breining et al. | 707/3 |
| 2004/0022379 A1 | 2/2004 | Klos et al. | |
| 2004/0073539 A1* | 4/2004 | Dettinger et al. | 707/3 |
| 2004/0088320 A1* | 5/2004 | Perry | 707/103 R |
| 2004/0103090 A1* | 5/2004 | Dogl et al. | 707/3 |
| 2004/0243564 A1* | 12/2004 | Taylor et al. | 707/3 |
| 2004/0243576 A1* | 12/2004 | Shrivastava et al. | 707/5 |
| 2004/0243593 A1* | 12/2004 | Stolte et al. | 707/100 |
| 2004/0267760 A1* | 12/2004 | Brundage et al. | 707/100 |
| 2005/0015368 A1* | 1/2005 | Payton et al. | 707/4 |
| 2005/0039033 A1* | 2/2005 | Meyers et al. | 713/193 |
| 2005/0060647 A1* | 3/2005 | Doan et al. | 715/514 |
| 2005/0091223 A1* | 4/2005 | Shaw et al. | 707/100 |
| 2005/0091253 A1* | 4/2005 | Cragun et al. | 707/102 |
| 2005/0149584 A1* | 7/2005 | Bourbonnais et al. | 707/204 |
| 2005/0203876 A1* | 9/2005 | Cragun et al. | 707/3 |
| 2005/0216555 A1* | 9/2005 | English et al. | 709/204 |
| 2006/0004740 A1* | 1/2006 | Dettinger et al. | 707/4 |
| 2006/0075205 A1* | 4/2006 | Martin et al. | 711/200 |
| 2006/0101073 A1* | 5/2006 | Popa et al. | 707/104.1 |
| 2006/0167856 A1* | 7/2006 | Angele et al. | 707/3 |
| 2006/0167867 A1* | 7/2006 | Schach et al. | 707/4 |
| 2006/0259509 A1* | 11/2006 | Stolte et al. | 707/102 |
| 2006/0265391 A1* | 11/2006 | Posner et al. | 707/10 |
| 2006/0271884 A1* | 11/2006 | Hurst | 715/854 |
| 2007/0011167 A1* | 1/2007 | Krishnaprasad et al. | 707/9 |
| 2007/0022107 A1* | 1/2007 | Yuan et al. | 707/4 |
| 2007/0112727 A1* | 5/2007 | Jardine et al. | 707/3 |
| 2007/0233655 A1* | 10/2007 | Engels | 707/3 |
| 2008/0120268 A1* | 5/2008 | Ruiz et al. | 707/1 |
| 2013/0124528 A1* | 5/2013 | Gourdol et al. | 707/740 |

OTHER PUBLICATIONS

Silva et al., "Formalizing Visual Interaction With Historical Databases", In Journal of Information Systems 27 (2002), 2002, pp. 487-521.*

Jingtao Zhou et al., "XML-RDB Driven Semi-Structure Data Management", Journal of Information and Computing Science, 2006 vol. 1 (5): pp. 266-274.

* cited by examiner

TECHNIQUES FOR COMPOSING DATA QUERIES

BACKGROUND OF THE INVENTION

1. Field of the Invention

The invention generally relates to computer database systems. More particularly, the invention relates to techniques for composing queries of hierarchical data.

2. Description of the Related Art

Extensible Markup Language (XML) is a widely-adopted standard for describing data. Typically, an XML document stores data using a collection of markup tags to mark the start and end points of XML elements. Using XML, data may be structured and stored in a document, known as an XML document. Each XML element may also contain one or more name-value pairs known as attributes.

Commonly, XML documents may be used to store hierarchical data, meaning that the XML elements are organized into a hierarchical structure, with the elements linked by parent-child relationships. In such cases, the hierarchical data may be modeled as a tree made up of connected nodes. The nodes at one level of the tree may be linked to one or more nodes at a different level, with linked nodes at a higher level referred to as parent (or ancestor) nodes, and those in lower levels referred to as child (or descendant) nodes. A parent node may represent a first element, and a child node may represent either an attribute of the first element, or a second element nested inside the first element. XML documents may include a single node at the top level of the tree, referred to as the root node. The XML Path Language, known as XPath, is an expression language that provides the ability to access nodes of a tree hierarchy. One type of XPath expression is a path expression, which is written as a sequence of steps to get from one node of the tree to another node.

In some situations, a query tool may be provided to users wishing to create queries of hierarchical data. In one approach, the query tool may allow the user to specify a text keyword search to locate any data records that match one or more of the specified keywords. However, this approach can often return inexact results. That is, since the keywords may be present in nodes of the hierarchy which are of no interest to the end user, the query results may include many records that are not useful.

In another approach, a query tool may be configured by expert users (i.e., developers) to enable users to specify predicates for specific nodes of the tree structure. This approach requires that, as part of configuring the query tool, the developers identify certain key nodes that may be queried by the end users, as well as the paths required to access each of the possible combinations of the key nodes. Such a query tool allows an end user to perform an exact search, meaning that the query returns the data records having the precise match to the specified predicates. This approach is most common in situations where there are a limited number of nodes that the user may wish to query.

However, where the tree structure is complicated (i.e., having many levels and nodes), or where there are many nodes that an end user may wish to query, the number of combinations of nodes, and thus the number paths required to be mapped, can rapidly become too large to work with. Consequently, in such situations, this approach becomes impractical.

Accordingly, for the reasons discussed above, there is a need for improved techniques for composing queries of hierarchical data.

SUMMARY OF THE INVENTION

One embodiment of the invention provides a computer-implemented method of composing a query of hierarchical data. The method generally includes receiving a selection of at least one query node from a set of one or more query nodes included in a query tool. Each query node represents elements of the hierarchical data and a mapping template specifies mappings from the one or more query nodes of the query tool to the elements of the hierarchal data. The method also includes, presenting, in the query tool, a form for entering a query predicate corresponding to the at least one selected query node and includes receiving, in the query tool, one or more query predicates specified in the form. The method also includes composing a query of the hierarchical data from a base query, the one or more query predicates, and the mapping template, where the base query identifies a data source for the composed query. The method also includes modifying the base query to include the one or more query predicates.

Another embodiment of the invention includes a computer program product comprising a computer useable storage medium having a computer readable program resident thereon, wherein the computer readable program, when executed on by one or more processors, causes the one or more processors to perform an operation. The operation generally includes receiving a selection of at least one query node from a set of one or more query nodes included in a query tool. Each query node represents elements of the hierarchical data and a mapping template specifies mappings from the one or more query nodes of the query tool to the elements of the hierarchal data. The operation also includes presenting, in the query tool, a form for entering a query predicate corresponding to the at least one selected query node and receiving, in the query tool, one or more query predicates specified in the form. The operation also includes composing a query of the hierarchical data from a base query, the one or more query predicates, and the mapping template. The base query identifies a data source for the composed query. The operation also includes modifying the base query to include the one or more query predicates.

Another embodiment of the invention includes a system having a processor and a memory containing a program configured to compose a query of hierarchical data. The program is generally configured to perform an operation that includes receiving a selection of at least one query node from a set of one or more query nodes included in a query tool. Each query node represents elements of the hierarchical data and a mapping template specifies mappings from the one or more query nodes of the query tool to the elements of the hierarchal data. The operation performed by the program further includes presenting, in the query tool, a form for entering a query predicate corresponding to the at least one selected query node and the mapping template and receiving, in the query tool, one or more query predicates specified in the form. The program is further configured to compose a query of the hierarchical data from a base query, the one or more query predicates, and the mapping template, where the base query identifies a data source for the composed query, and to modify the base query to include the one or more query predicates.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
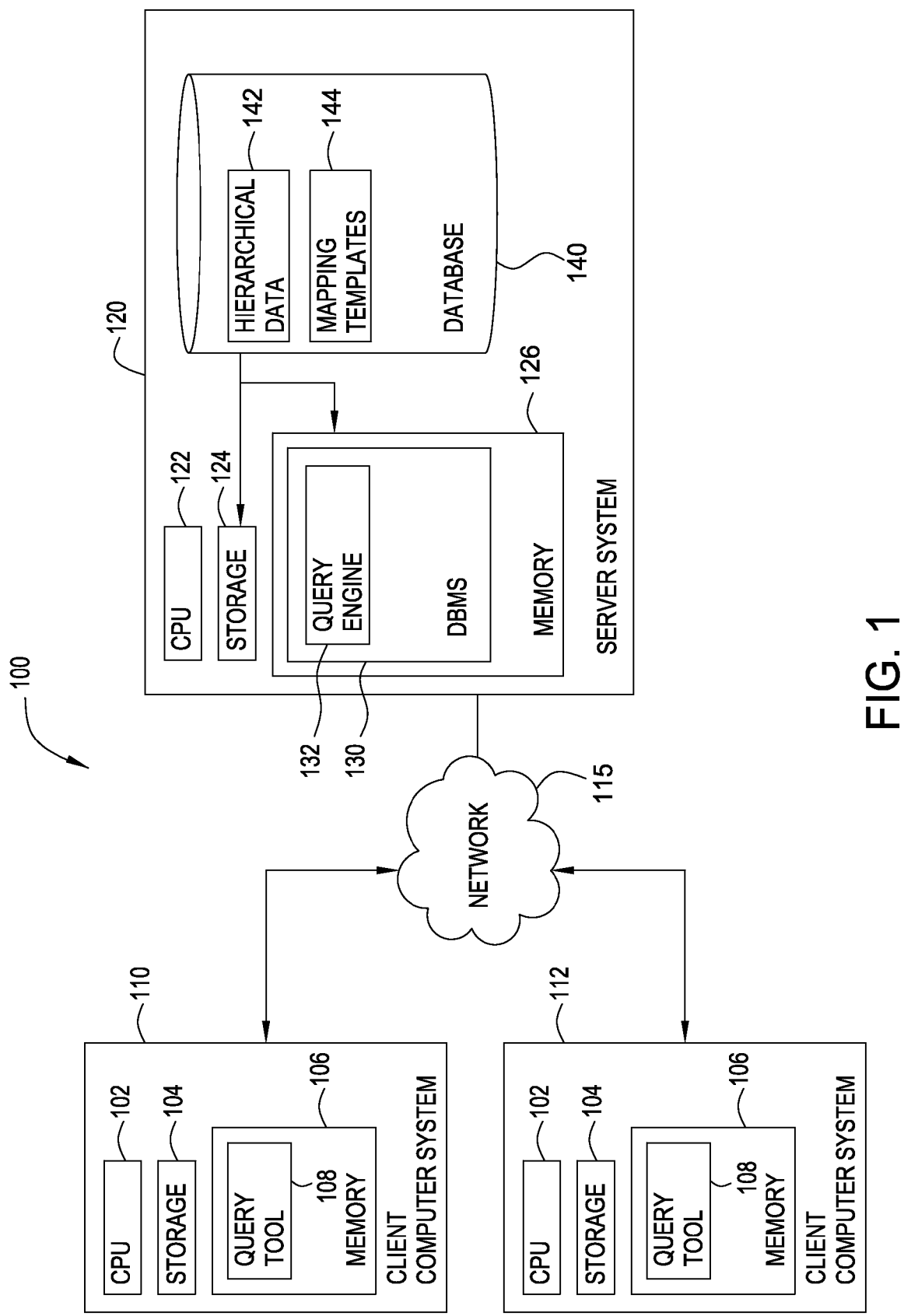
FIG. 1 illustrates a network environment using a client-server configuration, according to one embodiment of the invention.

Embodiments of the invention provide techniques for specifying precise queries of hierarchical data. In one embodiment, a mapping template is created to represent the hierarchical data in terms that are easy to for users to understand. The mapping template is used to generate a query tool having a tree structure. The user may compose a query by navigating the tree structure to select nodes of interest, and specifying predicates for the selected nodes. The query tool may also include visualization hints (e.g., drop-down menus, etc.) to aid in specifying query predicates. In one embodiment, the predicates specified by a user may be combined with a base query. The base query provides the basic select clause which defines the format and location of the data to be returned as a result of the query. The base query can also have some fixed predicates that a developer or administrator might consider necessary to limit the search criteria. In one embodiment, the rest of the search expression that is generated as a result of the user input may be appended to the base query. Once the query is composed, it may be executed against the hierarchical data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Further, embodiments of the invention are described herein adapted for use with the widely used Extensible Markup Language (XML). Accordingly, references to data objects, documents, hierarchal result fields, and XML documents generally refers to data marked up using a well-formed collection of XML tags, elements and/or attributes. A given XML document may also be associated with additional artifacts such as a document type definition (DTD), XSLT transforms, XSL style sheets, and other associated files, tools and utilities. However, the invention is not limited to the XML markup language, XML schemas, and the use of XML documents; rather, embodiments of the invention may be adapted to other markup languages or other data object formats or data representations, whether now known or later developed.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes two client computer systems 110 and 112, network 115 and server system 120. In one embodiment, the computer systems illustrated in environment 100 may include existing computer systems, e.g., desktop computers, server computers laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, client computer systems 110 and 112 each include a CPU 102, storage 114 and memory 106, typically connected by a bus (not shown). CPU 102 is a programmable logic device that performs all the instruction, logic, and mathematical processing in a computer. Storage 104 stores application programs and data for use by client computer systems 110 and 112. Storage 104 includes hard-disk drives, flash memory devices, optical media and the like. The network 115 generally represents any kind of data communications network. Accordingly, the network 115 may represent both local and wide area networks, including the Internet. The client computer systems 110 and 112 are also shown to include a query tool 108. In one embodiment, query tool 108 is software application that allows end users to access information stored in a database (e.g., database 140).

In one embodiment, the server 120 includes a CPU 122, storage 124, memory 126, a database 140, and a database management system (DBMS) 130. DBMS 130 provides a software application used to organize, analyze, and modify information stored in a database 140. DBMS 130 includes a query engine 132. Query engine 132 may be configured to process database queries submitted by a requesting application (e.g., a query generated using query tool 108) and to return a set of query results to the requesting application.

As shown, database 140 includes hierarchical data 142 and mapping templates 144. Hierarchical data 142 includes data stored using a hierarchical structure, meaning that it is organized in a tree-like structure of nodes having parent-child relationships. For example, hierarchal data 142 may include a collection of XML documents. Each mapping template 144 may provide a simplified representation of some portion of the hierarchical data 142. Although a mapping template 144 may be created using a variety of criteria; typically, a mapping template 144 includes the nodes which represent a particular area of interest to the end users (i.e., a data domain). Mapping templates 144 are created by developers, and, once created, are used to generate a query tool 108 for end users. More specifically, query tool 108 may be configured to use mapping templates 144 to enable end users to compose queries by specifying predicates for the relevant nodes of hierarchical data 142. As a result, the end users can compose precise queries of hierarchical data 142 without having to be familiar with the corresponding schema (i.e., the specific nodes names and tree structure of the hierarchical data).

Figure 2:
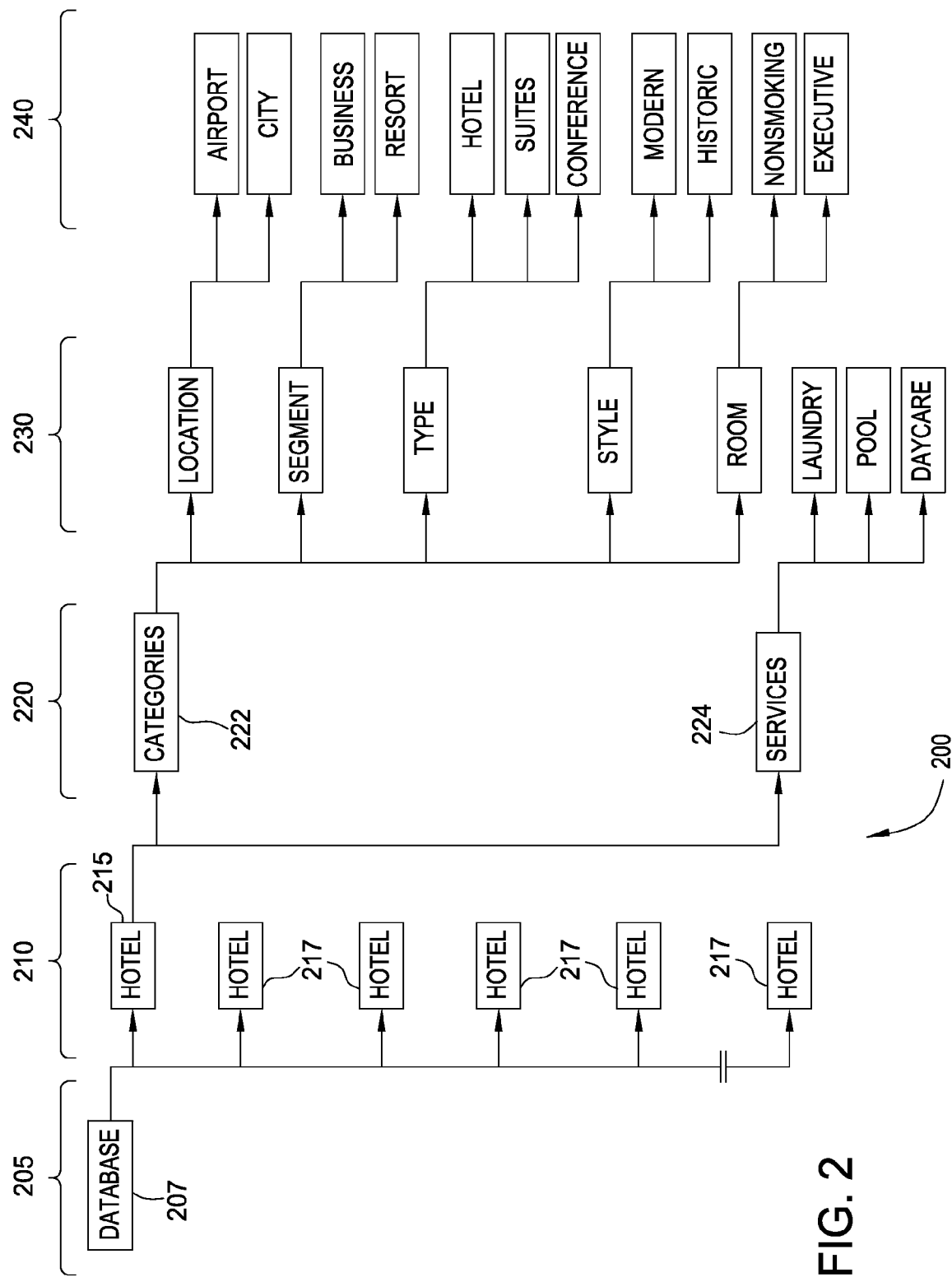
FIG. 2 illustrates an exemplary tree structure of hierarchical data, according to one embodiment of the invention.

FIG. 2 illustrates an exemplary tree structure 200 of hierarchical data, according to one embodiment of the invention. In this example, tree structure 200 corresponds to a collection of hierarchical data related to a group of hotels and the services, amenities, and features offered by the hotels. Such a database may be used, for example, as part of a travel reservations application. As shown, tree structure 200 includes five layers of nodes. The first layer 205 includes a root node 207, which represents the database itself. The second layer 210 includes a first node 215, and additional nodes 217. All nodes of the second layer 210 are labeled "HOTEL," indicating that each node represents an individual hotel. It should be assumed that each "HOTEL" node has child nodes below it that represent data related to that hotel. However, for the sake of clarity, the child nodes are only shown for the first "HOTEL" node 215.

A third layer 220 includes a "CATEGORIES" node 222 and a "SERVICES" node 224, both children of the first node 215, and both storing data related to the corresponding hotel. As shown, "SERVICES" node 224 has three child nodes included in a fourth layer 230, indicating that possible attributes for the "SERVICES" node 224 include "LAUNDRY," "POOL," and "DAYCARE." Fourth layer 230 also includes a set of child nodes that descend from the "CATEGORIES" node 222, and which represents categories of hotels that a user may search by. As shown, the category nodes included in layer 230 represent the "LOCATION," "SEGMENT," "TYPE," "STYLE," and "ROOM" categories. Finally, a fifth layer 240 includes nodes that are descendent from the category nodes of layer 230, representing the possible attributes of each category. Note however, tree structure 200 is simplified to highlight aspects of the present invention, and that in a typical "live" or "production" environment, tree structure 200 would be expected to be much more complex.

In one embodiment, hierarchical data 142 may be stored in an XML document. Table I illustrates an example of an XML document corresponding to the tree structure 200 illustrated in FIG. 2. Of course, Table I is provided for illustrative purposes, and is not intended to limit the scope of the invention. It is contemplated that hierarchical data 142 may also be stored using other techniques.

TABLE I

HOTEL DATA EXAMPLE

| | |
|---|---|
| 001 | <HotelData Name="STAR" HotelCode="110"> |
| 002 |   <CategoryCodes> |
| 003 |     <Location Code="2"/> |
| 004 |     <Segment Code="30"/> |
| 005 |     <Type Code="1"/> |
| 006 |     <Style Code="5"/> |
| 007 |     <Room Code="2" Quantity=""/> |
| 008 |   </CategoryCodes> |
| 009 |   <Services> |
| 010 |     <Service Code="12" /> |
| 011 |   </Services> |
| 012 | </HotelData> |
| 013 | <HotelData Name="RITZ" HotelCode="112"> |
| 014 |   <CategoryCodes> |
| 015 |     <Location Code="1"/> |
| 016 |     <Segment Code="20"/> |
| 017 |     <Type Code="1"/> |
| 018 |   </CategoryCodes> |
| 019 |   <Services> |
| 020 |     <Service Code="11" /> |
| 021 |     <Service Code="12" /> |
| 022 |   </Services> |
| 023 | </HotelData> |

Line 001 of Table I includes a "HotelData" opening tag, indicating the start of a data element describing a specific hotel. In this example, line 001 corresponds to the node 215 shown in FIG. 2. As shown, the attributes of the "HotelData" tag in line 001 indicate that the hotel is named "STAR" and has a "HotelCode" identifier of "110." Line 002 includes a "CategoryCodes" opening tag, which is matched by a closing tag on line 008. Thus, lines 003 to 007 include data for the various categories which describe the "STAR" hotel. The <CategoryCodes> element and the <Services> element are each child nodes of the parent <HotelData> element. Additionally, these child elements have their own child elements. Specifically, line 002 corresponds to the "CATEGORIES" node 222 illustrated in FIG. 2. As shown, line 003 specifies a "Location Code" and a numerical value. Similarly, lines 004 to 007 respectively specify segment, type, style, and room codes, as well as numerical values for each code. Thus, lines 003 to 007 correspond to the category nodes included in the fourth layer 230 of FIG. 2, and the numerical values specified for the category codes correspond to the nodes of fifth layer 240 of FIG. 2 (i.e., the possible attributes of each category). Lines 009 to 011 store data for services available at the hotel "STAR," corresponding to "SERVICES" node 224. Specifically, the attribute value "12" included in line 010 indicates that there is one service available at the hotel "STAR," corresponding to one of the attribute values included in third layer 230 (e.g., "LAUNDRY," "POOL," or "DAYCARE"). Line 012 includes a "HotelData" closing tag, indicating the end of the data element describing the hotel "STAR."

Generally, each record (i.e., element) of hierarchical data is based on a common schema (i.e., a collection of XML tags that may be included for a given XML document), but may include a different internal hierarchy (i.e., the actual data values for different records will differ from one another). This aspect is illustrated in lines 013 to 023 of Table 2. Line 013 indicates the start of a second data element, ending at line 023, which describes a second hotel "RITZ," and which is structured similarly to the data element describing the hotel "STAR." Lines 015 to 017 respectively include location, segment, and type codes, corresponding to category and attribute nodes included in layers 230 and 240 of FIG. 2. However, in this case, there are no lines for style or room codes. Lines 020 and 021 are child nodes named <ServiceCode> that are the data elements for the <Services> element. In this example, the nodes at lines 020 and 021 indicate the hotel "RITZ" has two attribute values for services.

Figure 3:
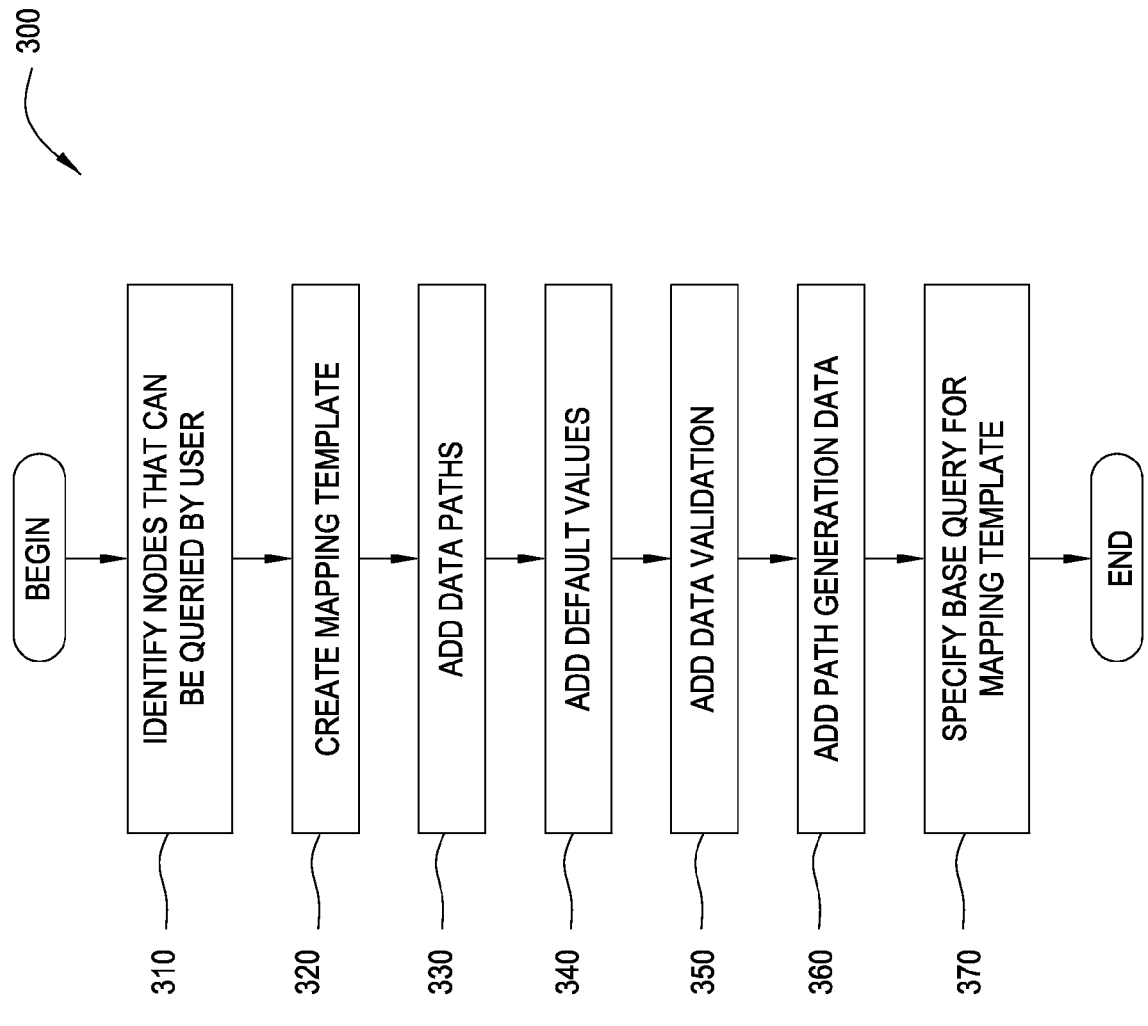
FIG. 3 is a flow diagram illustrating a method for generating mapping templates for querying hierarchical data, according to one embodiment of the invention.

FIG. 3 is a flow diagram illustrating a method 300 for generating mapping templates for querying hierarchical data, according to one embodiment of the invention. Persons skilled in the art will understand that, even though the method 300 is described in conjunction with the systems of FIG. 1, any system configured to perform the steps of method 300, in any order, is within the scope of the present invention.

As shown, the method 300 begins at step 310, by identifying nodes of hierarchical data (e.g., hierarchical data 142) that may be queried by an end user. This step may be performed by analyzing a data hierarchy (e.g., tree structure 200). In the example described herein, the target end user is one expected to perform searches of a specific domain of data, in this case, precise searches for a specific hotel. The nodes identified in step 310 relate to attributes of interest to the target end user (e.g., location, services, etc.). At step 320, the mapping template (e.g., mapping template 144) is created using the identified nodes. In one embodiment, the mapping template is composed in XML.

At step 330, data paths included in the underlying XML document are added to the mapping template. The data paths may be, for example, XPath expressions. In addition, the data paths may be simplified by collapsing multiple levels of the hierarchy (e.g., levels 220 and 230) into one level. By including the data paths and simplifying the hierarchy in the mapping template, the complexity of the hierarchical data is hidden from the end user, while still allowing the user to compose precise queries of the hierarchical data.

At step 340, default attribute values are added to the mapping template. These defaults may be presented to the end user in, for example, drop-down menus of a query tool. At step 350, data validation values and rules can be added to the mapping template. In one embodiment, this information may be used to validate any data entered in the query tool. For example, a rule may specify that a query predicate related to the number of beds in a hotel room should be restricted to a numerical value of 1, 2, or 3. The query tool may be configured to use the default values and data validation to simplify the process of composing a query. At step 360, path generation data may be added to the mapping template. For example, a data source URL (i.e., the location of a given database) and/or XML namespace information may be included in the mapping template.

At step 370, a base query is specified for the mapping template. The base query defines the data that may be returned when the query is executed. In other words, the predicates selected in the query tool serve to filter the data returned by the base query. The base query may be hidden from end users, and may thus serve to limit visibility of the underlying data structure. In one embodiment, a mapping template may include multiple base queries, with one particular base query being selected based on selections or entries of the end user.

Using SQL as an example, the base query provides the basic SELECT clause which defines the format and location of the data to be returned as a result of the query. The base query can also have some fixed predicates that a developer might consider necessary to limit the search criteria. Some examples of a base query appropriate for the travel and tourism example being used to illustrate embodiments of the present invention include:

SELECT * FROM users—returns all fields in the users table for selected records

SELECT id, info from users—returns only id and info fields for selected records

SELECT info from users where org='IBM'—Returns info field and narrows search down to only records for IBM organization.

As described below, once the appropriate base query is defined, embodiments of the invention may allow a user to select additional predicates by interacting with the query tool.

Figure 4A:
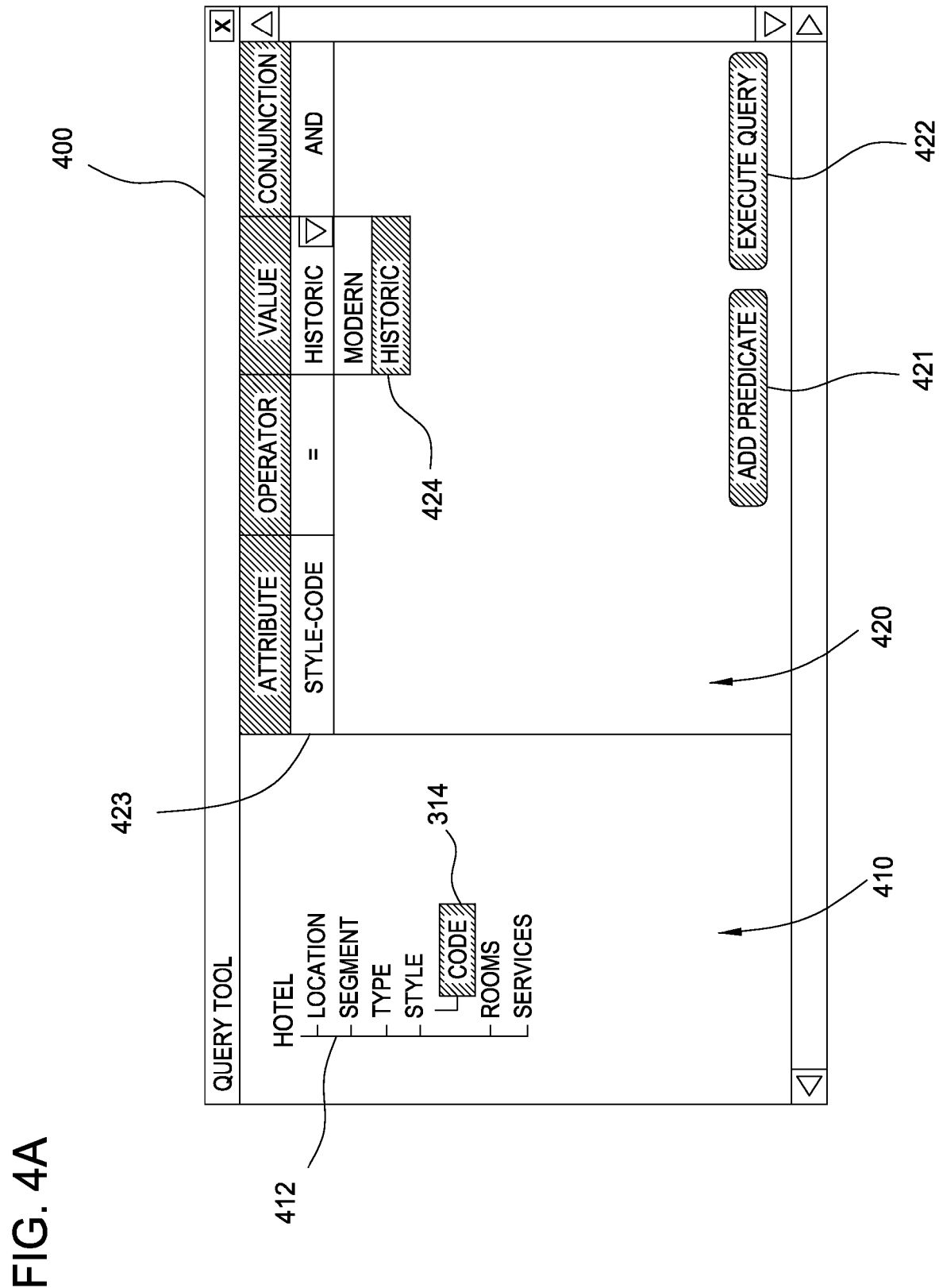
FIGS. 4A and 4B illustrate a view of a screen of a query tool for composing queries of hierarchical data, according to one embodiment of the invention.

For example, FIG. 4A illustrates a view of a screen 400 of a query tool (e.g., query tool 108) for composing queries of hierarchical data, according to one embodiment of the invention. As shown, screen 400 includes a node selection area 410 and a predicate entry area 420. Node selection area 410 includes a node tree 412, which includes labels for each node of a mapping template (e.g., category nodes of FIG. 2). Predicate entry area 420 includes a predicate line 423, an "ADD PREDICATE" button 421, and an "EXECUTE QUERY" BUTTON 422. Predicate line 423 includes an "attribute" entry field, an "OPERATOR" field, a "VALUE" field, and a "CONJUCTION" field, which enable the user to specify a query predicate. In this case, a user has selected the "STYLE" node in the node tree 412, resulting in the display of the label "CODE." In this example, the user has selected the label "CODE," resulting in the predicate line 423 being populated with an "ATTRIBUTE" value of "STYLE-CODE", and the "VALUE" field to be populated with the default values for the "STYLE" attribute. In one embodiment, the "VALUE" field includes a pull-down menu 424 which lists the values "MODERN" and "HISTORIC," which are the default values of the "STYLE" attribute. In this example, the user has selected the default value "HISTORIC," meaning that the wishes to search for hotels having a historic style.

Figure 4B:
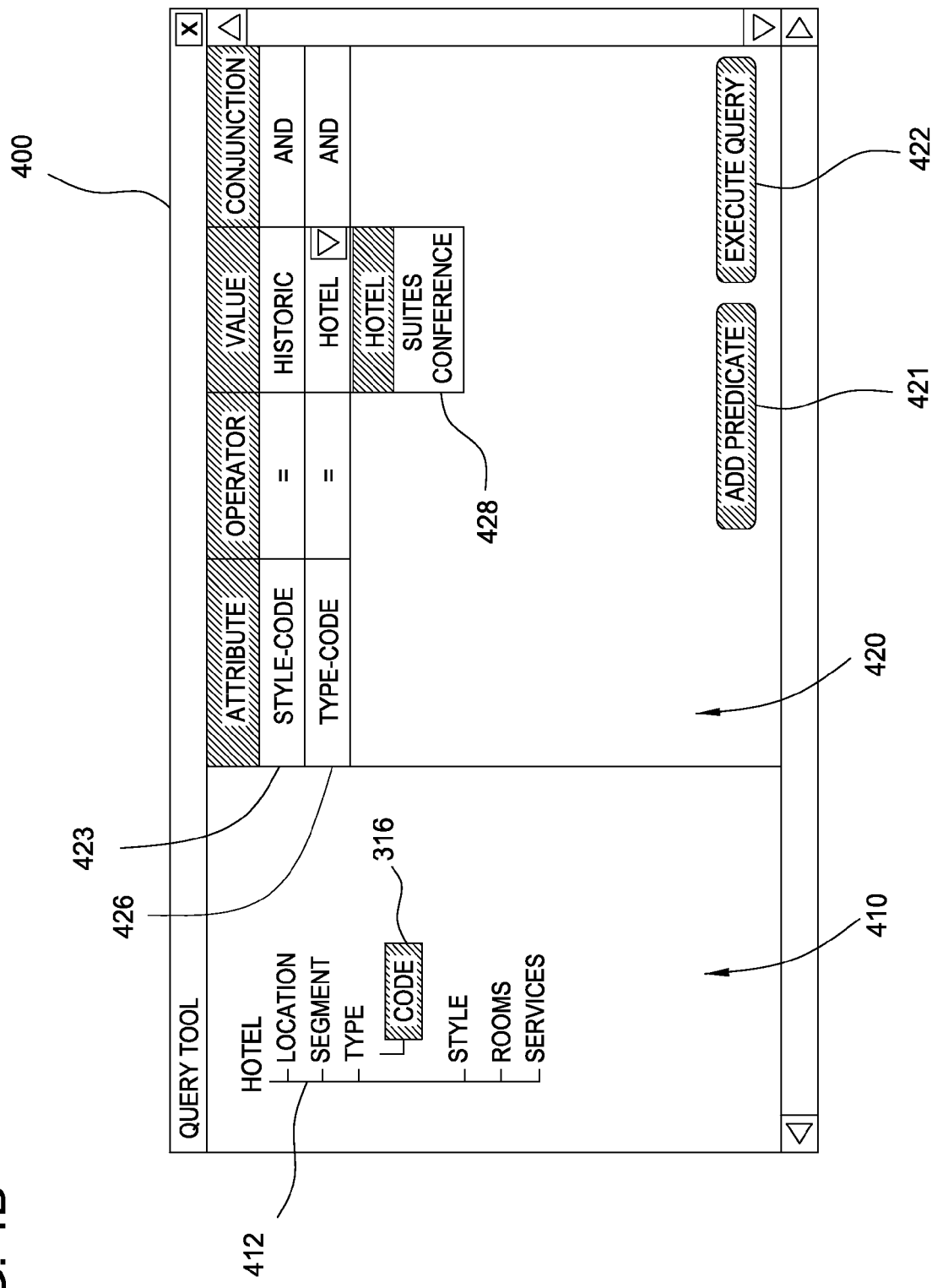

FIG. 4B illustrates the screen 400 in the situation where the user has further selected the "ADD PREDICATE" button 421 of the query tool, resulting in a second predicate line 426 to be added to the predicate entry area 420. In this case, the user has also selected the "TYPE" node in the node tree 412, resulting in the display of the label "CODE" 316. The user has selected the label "CODE," resulting in the second predicate line 426 being populated with an "ATTRIBUTE" value of "TYPE-CODE", and the "VALUE" field to be populated with the default values for the "TYPE" attribute. In one embodiment, the "VALUE" field includes a pull-down menu 428 which lists the values "HOTEL," "SUITES," and "CONFERENCE," which are the default values of the "TYPE" attribute. Once the query is composed, the user selects the "EXECUTE QUERY" button 422 to execute the query. The composed query may be executed, for example, by query engine 132.

Figure 5:
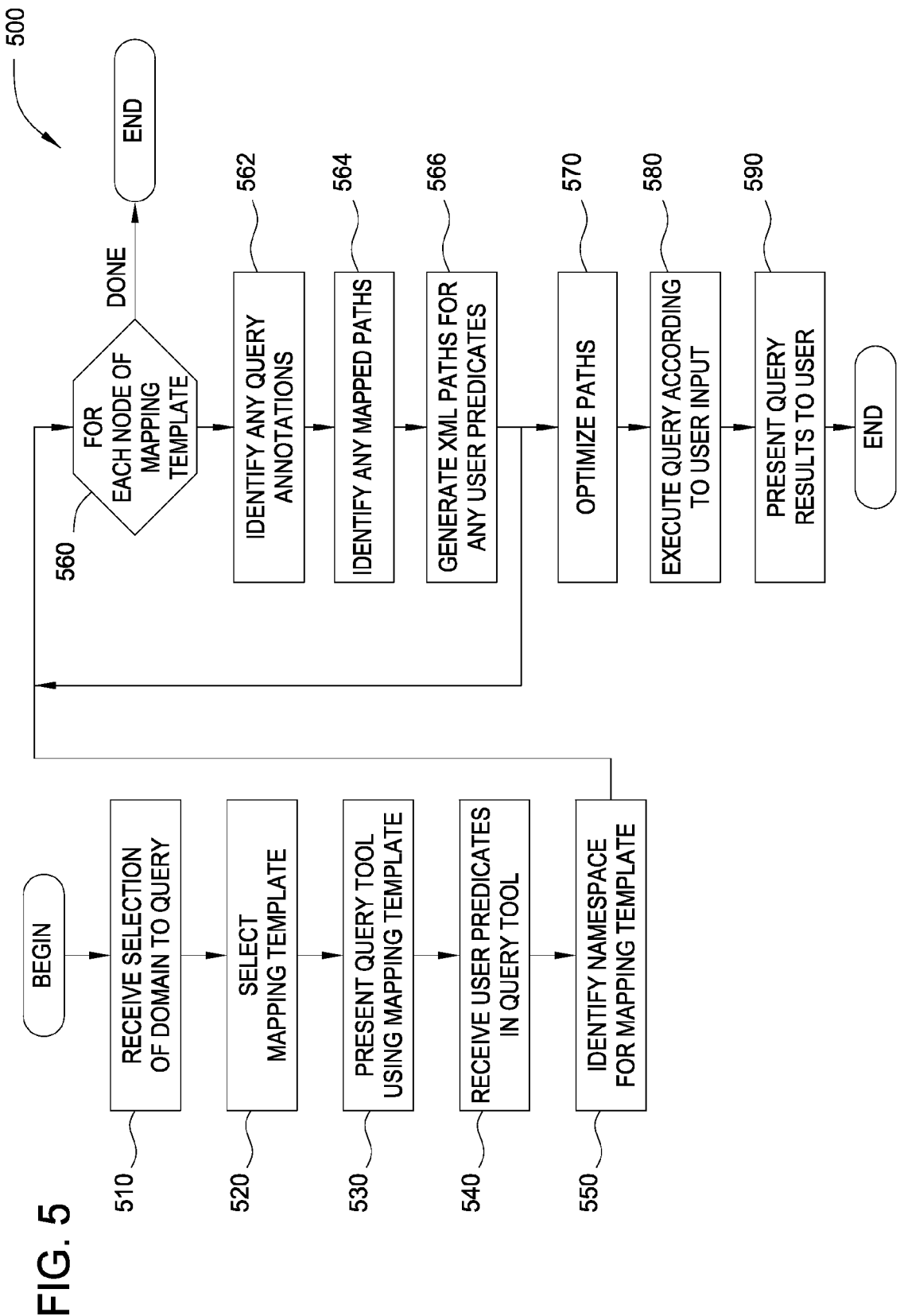
FIG. 5 is a flow diagram illustrating a method for composing queries of hierarchical data using mapping templates, according to one embodiment of the invention.

FIG. 5 is a flow diagram illustrating a method 500 for composing queries of hierarchical data using mapping templates, according to one embodiment of the invention. Persons skilled in the art will understand that, even though the method 500 is described in conjunction with the systems of FIG. 1, any system configured to perform the steps of method 500, in any order, is within the scope of the present invention.

As shown, the method 500 begins at step 510, where the user may specify a selection of a data domain that the user wishes to query. The data domain may represent an area of interest to a given user, such as hotels available for booking by travelers. The data domain may be selected, for example, by a user interacting with query tool 108. At step 520, the selected data domain may be used to identify an appropriate mapping template. The mapping template(s) may be created in advance by a developer using the method 300 described above. In the case were there are multiple available mapping templates available, the query tool may be configured to determine which one is most appropriate to the user's needs.

At step 530, a query tool (e.g., query tool 108) is generated using the selected mapping template, and is presented to the user. In one embodiment, the query tool may be configured in the manner illustrated in FIGS. 4A-4B, including a node selection area and a predicate entry area. At step 540, selections made by the user are received. The selections may be generated by the user interacting with the query tool to select relevant nodes and specify predicates for the selected nodes. The query tool may be configured to compose a query based on the received selections. At step 550, any namespace information included in the mapping template is identified and included in the query. The namespace information may be used to resolve any element and attribute names when the query is executed.

At step 560, the method 500 enters a loop (defined by steps 560, 562, 564, and 566) for processing each node of the mapping template. At step 562, any query annotations referencing the node are identified. In one embodiment, the query annotations are specified in the mapping template by the developer, and store elements of the query that are hidden from the end user. The query annotations for a node are identified even if the user has not specified any predicates for the node. That is, the query annotations may specify values for attributes that a user may not need to (or be allowed to) modify in composing a query. For example, a hotel reservations query tool data that is provided to corporate employees may be based on a mapping template that include a query annotation specifying that the query results only include hotels having a corporate discount. In this example, the query annotation, as well as the corresponding node, may be hidden from the end user.

At step 564, any mapped paths related to the node are identified by the end user as part of building the query. That is the end user selects some of the mapped paths as being of interest in the search. A mapped path is a data path that is coded into the mapping template by the developer. As with query annotations, mapped paths can serve to hide some of the complexity of building a query from the end user. The identified mapped paths are incorporated into the finished query. At step 566, data paths for any predicates specified by the user are generated. That is, data paths (e.g., XPath path expressions) are generated for the query to access the elements of the XML data referenced by the predicates. Once all nodes of the mapping template are processed at step 560, the method 500 continues at step 570.

At step 570, the data paths of the mapping template may be optimized. That is, in the case of a query having multiple predicates, the data paths of each predicate may be combined at some common node of the hierarchy. For example, a query may be optimized so that the data path of each element of the query is not addressed starting from the root node (e.g., root node 215), and may thus make the query execution more efficient. At step 580, the query specified in the query tool is executed. The query execution may be performed, for example, by query engine 132. At step 590, the query results are presented to the user.

While the foregoing is directed to embodiments of the present invention, other and further embodiments of the invention may be devised without departing from the basic scope thereof, and the scope thereof is determined by the claims that follow.

What is claimed is:

1. A computer-implemented method for composing a query for accessing data, comprising:
  receiving a selection of at least one query node from a plurality of query nodes wherein each query node represents an element of the data, wherein the data comprises data stored using a data structure defined by a schema, and wherein a mapping template specifies a mapping between at least one of the plurality of query nodes and the elements of the data;
  upon receiving one or more query predicates designated for the at least one selected query node, validating the one or more query predicates using the mapping template; and
  composing, by operation of one or more computer processors, the query for accessing the data, using a base query, the validated one or more query predicates, the mapping template, and a hidden predicate specified in a query node annotation defined by the mapping template, wherein the base query identifies a data source for the composed query.

2. The computer-implemented method of claim 1, further comprising:
  executing the composed query to obtain a query result; and
  presenting the query result to a user.

3. The computer-implemented method of claim 1, wherein the plurality of query nodes is presented in a tree representation of the data.

4. The computer-implemented method of claim 1, wherein the at least one of the plurality of query nodes specified in the mapping template comprises at least one node of the data that is queried by a user.

5. The computer-implemented method of claim 1, wherein composing the query comprises evaluating any query annotations defined in the mapping template, wherein the query annotations specify elements that are included in each query composed, and wherein the query annotations are hidden from a user.

6. The computer-implemented method of claim 1, wherein composing the query comprises incorporating a data path defined in the mapping template, wherein the data path is used to identify locations of data in the data.

7. The computer-implemented method of claim 1, wherein a query tool presents a form for entering a query predicate corresponding to the at least one selected query node, wherein the form includes at least one of a default value set and a validation rule, wherein the default value set provides a predefined set of one or more values available for composing query predicates corresponding to the selected at least one query node, and wherein the validation rule constrains what a user is permitted to enter into the form, wherein the default value set and the validation rule are defined in the mapping template.

8. A computer program product comprising a non-transitory computer-useable medium having a computer-readable program resident thereon, the computer-readable program executable by one or more processors to perform an operation for composing a query for accessing data, the operation comprising:

receiving a selection of at least one query node from a plurality of query nodes, wherein each query node represents an element of the data, wherein the data comprises data stored using a data structure defined by a schema, and wherein a mapping template specifies a mapping between at least one of the plurality of query nodes and the elements of the data;

upon receiving one or more query predicates designated for the at least one selected query node, validating the one or more query predicates using the mapping template; and composing the query for accessing the data, using a base query, the validated one or more query predicates, the mapping template, and a hidden predicate specified in a query node annotation defined by the mapping template, wherein the base query identifies a data source for the composed query.

9. The computer program product of claim 8, wherein the operation further comprises:

executing the composed query to obtain a query result; and presenting the query result to a user.

10. The computer program product of claim 8, wherein the plurality of query nodes is presented in a tree representation of the data.

11. The computer program product of claim 8, wherein the at least one of the plurality of query nodes specified in the mapping template comprises at least one node of the data that is queried by a user.

12. The computer program product of claim 8, wherein composing the query comprises evaluating any query annotations defined in the mapping template, wherein the query annotations specify elements that are included in each query composed, and wherein the query annotations are hidden from a user.

13. The computer program product of claim 8, wherein composing the query comprises incorporating a data path defined in the mapping template, wherein the data path is used to identify locations of data in the data.

14. The computer program product of claim 8, wherein a query tool presents a form for entering a query predicate corresponding to the at least one selected query node, wherein the form includes at least one of a default value set and a validation rule, wherein the default value set provides a predefined set of one or more values available for composing query predicates corresponding to the selected at least one query node, and wherein the validation rule constrains what a user is permitted to enter into the form, wherein the default value set and the validation rule are defined in the mapping template.

15. A system, comprising:

one or more computer processors; and a memory containing a program which, when executed by the one or more computer processors, performs an operation to compose a query for accessing data, the operation comprising:

receiving a selection of at least one query node from a plurality of query nodes, wherein each query node represents an element of the data, wherein the data comprises data stored using a data structure defined by a schema, and wherein a mapping template specifies a mapping between at least one of the plurality of query nodes and the elements of the data;

upon receiving one or more query predicates designated for the at least one selected query node, validating the one or more query predicates using the mapping template; and composing the query for accessing the data, using a base query, the validated one or more query predicates, the mapping template, and a hidden predicate specified in a query node annotation defined by the mapping template, wherein the base query identifies a data source for the composed query.

16. The system of claim 15, wherein the operation further comprises:

executing the composed query to obtain a query result; and presenting the query result to a user.

17. The system of claim 15, wherein the plurality of query nodes is presented in a tree representation of the data.

18. The system of claim 15, wherein the at least one of the plurality of query nodes specified in the mapping template comprises at least one node of the data that is queried by a user.

19. The system of claim 15, wherein composing the query comprises evaluating any query annotations defined in the mapping template, wherein the query annotations specify elements that are included in each query composed, and wherein the query annotations are hidden from a user.

20. The system of claim 15, wherein composing the query comprises incorporating a data path defined in the mapping template, wherein the data path is used to identify locations of data in the data.

21. The system of claim 15, wherein a query tool presents a form for entering a query predicate corresponding to the at least one selected query node, wherein the form includes at least one of a default value set and a validation rule, wherein the default value set provides a predefined set of one or more values available for composing query predicates corresponding to the selected at least one query node, and wherein the validation rule constrains what a user is permitted to enter into the form, wherein the default value set and the validation rule are defined in the mapping template.

* * * * *